Patented July 10, 1951

2,560,050

UNITED STATES PATENT OFFICE 2,560,050

RECLAIMING RUBBER WITH PHENOL SULFOXIDES

Wendell S. Cook, Houghton, Mich., assignor to The Firestone Tire & Rubber Company, Akron, Ohio, a corporation of Ohio No Drawing. Application June 29, 1949, Serial No. 102,155

6 Claims. (Cl. 260—23)

This invention relates to the reclaiming of vulcanized conjugated diene polymer composition.

"Conjugated diene polymer compositions" as used herein is meant to include natural rubber, copolymers of butadiene and styrene, copolymers of butadiene and acrylonitrile, 2-chlorobutadiene polymers, polybutadiene and other copolymerizates of 1,3-butadiene, isoprene or chloroprene with a polymerizable ethylene derivative as well as mixtures of two or more of these polymers.

"Reclaiming" as used herein may be understood to mean treating or processing waste vulcanized materials of the class broadly outlined immediately above in such a manner that products obtained thereby become plastic and processable and thus may again be utilized to produce new articles of manufacture.

Any of the vulcanizates known in the rubber art can be reclaimed in accordance with the invention. Most of the conjugated diene polymers are usually vulcanized with sulfur, but others, notably the chlorobutadiene polymers, may be vulcanized in the absence of sulfur by heating with a metal oxide, such as MgO. Other known vulcanizing agents include sulfur, sulfur halides, polysulfides of phenols or cresols, dialkyl xanthogen sulfides, tetraalkylthiuram sulfides, quinones, quinone dioximes, other quinone derivatives or other compounds known to vulcanize chemically unsaturated elastomers. Vulcanization may be effected with or without an accelerator.

Fundamental to a successful reclaiming operation is the reduction of a vulcanizate to a plastic workable mass. In the case of vulcanized natural rubber this may be accomplished by heat alone if maintained at a temperature substantially above that at which vulcanization occurred and for a sufficient length of time. In addition, however, certain oils and resins which act as swelling agents, plasticizers or tackifiers (e. g., solvent naphthas, turpentine, dipentene, asphalt, pine tar, rosin, coumarone resins, rosin oil and the like) are usually added to assist the process.

Also useful but to be distinguished from the oils and resins last mentioned are certain chemicals which act catalytically to hasten the reclaiming process rather than in a solvent or lubricating manner. Natural rubber has, for example, been reclaimed using such catalytic acting chemicals at temperatures as low as 150° F.

With the advent of so called synthetic rubbers, GR-S (butadiene-styrene types), N-type rubbers (butadiene-acrylonitrile types), and neoprene (chloroprene polymer types), during World War II new problems confronted the reclaimer. Vulcanizates of these substances do not behave as do those of natural rubber. Rather than having a softening or plasticating effect, heat renders them harder and more unworkable. Large portions of oils of the solvent or lubricating type were necessary to produce a workable material. But due to the large quantities of oil used, the resultant material possessed very poor physical properties. Therefore, catalytic type reclaiming additives, which will be active in relatively small quantities and especially those effective on synthetic rubber, become very important.

An object, therefore, of this invention is to produce a new class of compounds which are of utility in reclaiming vulcanized conjugated diene polymer compositions.

Another object is to produce a new class of compounds which, when included in relatively small amounts, will act catalytically to facilitate the reclaiming of vulcanized natural and synthetic rubber.

Another object is to provide a method of reclaiming synthetic type rubbers particularly of the butadiene-styrene, butadiene-acrylonitrile, and chlorobutadiene polymer types.

Another object is to provide reclaimed vulcanizates of conjugated diene polymer compositions having improved physical properties.

A still further object is to provide an improved method for the reclaiming of synthetic type rubbers.

The above and further objects will be manifest in the description of the invention which follows.

It has been found that members of a new class of chemical compounds are effective as reclaiming agents for rubber and rubber-like compounds. They are of particular value in the reclaiming of scrap GR-S type synthetic rubber and scrap mixtures containing both natural rubber and GR-S.

The new chemical compounds may be conveniently prepared by oxidizing the sulfur linkage of a corresponding bis(phenol) sulfide by controlled reaction of the latter substance with a suitable oxidizing agent as for example, hydrogen peroxide.

This new class of compounds is believed to have the following type formula

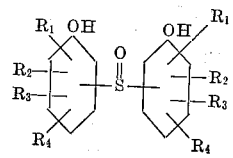

where $R_1$, $R_2$, $R_3$, and $R_4$ consist of a hydrogen atom or an alkyl group at least two of said $R_1$, $R_2$, $R_3$, and $R_4$ being alkyl radicals.

The following specific examples are given in further illustration of the invention.

EXAMPLE 1

A sample of 71.6 grams of bis (6-tert-butyl-3-methylphenol) sulfide was dissolved in 800 cc. of glacial acetic acid. To this solution 24 grams of thirty percent hydrogen peroxide were added and the resulting reaction mixture was allowed to stand seven days. The mixture was then diluted to 2 liters and the resulting precipitate was filtered and recrystallized twice from methanol to produce 59 grams of white crystalline material having a melting point of 179° C.

The following analysis indicates the substance to be the sulfoxide of the starting material:

|  | Per cent calculated for $C_{22}H_{30}O_3S$ | Per cent found |
| --- | --- | --- |
| Sulfur | 8.56 | 8.31 |
| Carbon | 70.60 | 70.45 |
| Hydrogen | 8.00 | 7.94 |

EXAMPLE 2

A sample of 23.5 grams of bis (4,6-di-tert-butyl-3-methyl-phenol) sulfide was dissolved in 4 liters of hot acetic acid. The resulting solution was cooled and 5.6 grams of thirty percent hydrogen peroxide were added. On proceeding as in Example 1 above, a yellow crystalline material was obtained having a melting point of 163° C. That this material was the sulfoxide of the starting material was indicated by the following analytical results:

|  | Per cent calculated for $C_{30}H_{46}O_3S$ | Per cent found |
| --- | --- | --- |
| Sulfur | 6.58 | 6.58 |

Di-, tri-, and tetra- alkyl phenol sulfoxides may be prepared in the manner illustrated above. Additional examples are as follows.

bis(4,6-dimethylphenol) sulfoxide
bis (3,4,6-trimethylphenol) sulfoxide
bis (3,4,5,6-tetramethylphenol) sulfoxide
bis (4,6-diethylphenol) sulfoxide
bis (3,4-dioctylphenol) sulfoxide
bis (4-methyl-6-octylphenol) sulfoxide
bis (3,5-dimethylphenol) sulfoxide Various experiments have been made with this type of reclaiming agent on synthetic type rubbers (butadiene-styrene copolymer, butadiene-acrylonitrile copolymer, and chlorobutadiene polymers) to demonstrate its reclaiming activity.

Indicative of value of a reclaimed rubber are the following qualities—softness, body, tack and sheeting facility. "Softness" (which may be characterized as lack of "nerve") may be determined by setting a refining mill to such a spacing that a piece of soft lead when passed between the rolls of the mill is squeezed to a thickness of 0.005 inch. The thickness of a sheeted reclaim product is a function of the degree of softening of such reclaim—the greater the thickness of the sheeted reclaim, the less the softening, and vice versa.

"Body" is that property of a reclaimed rubber which permits it to be stretched without tearing and having undue surface irregularities. "Tack" is a quality of adhesiveness which is desirable in reclaimed rubber in that it facilitates fabrication of a composite article in which one element must be adhered to another before the article is vulcanized. Since the two qualities last mentioned do not lend themselves well to instrument evaluation, they are customarily determined by hand estimation.

The body ratings contained in the tables, hereafter set forth, were estimated by observing the stretch or elongation of a refined sheet stretched by hand and by the appearance and uniformity of the stretched sheet, and were recorded as good (G), fair (F), poor (P), tough (T), and lacy (L) or some combination thereof.

Tack was estimated by laying a portion of the refined reclaimed sheet across the hand and then pressing the thumb and first finger together. When the thumb and first finger were spread apart, a small but definite force was required to separate the two adhering surfaces. A rating of 5 was given to the force required to separate a sheet of typical natural rubber whole tire reclaim. Milled crude rubber was given a rating of 10 and crude GR-S with no tack was given a rating of 0 (the higher the number the better the tack). Values between these assigned controls were estimated by the observer and could be duplicated easily by different independent observers with an accuracy of plus or minus one unit.

The facility of sheeting was noted by which roll the sheet adhered to on each pass (F—fast roll, S—slow roll, N—neither roll). Best sheeting quality is reflected by adherence to the fast roll; poorest, by adhering to neither. The reclaim was subjected to three refining passes and the observations as to thickness, body, and tack were made after the third pass.

Two hundred gram batches of material of the compositions indicated in Table I were mixed for ten minutes in a Baker-Perkins mixer. The mixture was then cooked for 4 hours in a pan heater at 175 p. s. i. steam pressure (377° F.) The material was then dried, cooled, mill-massed and subjected to three refining passes.

*Table I*

|  | Parts by weight | | |
| --- | --- | --- | --- |
|  | A | B | C |
| Ground GR-S tread scrap (5 mesh) | 100 | 100 | 100 |
| Dipentene fraction [1] (B. P. 173° to 201° C.) | 6.75 | 6 | 6 |
| Coumarone indene resin [2] | 6.75 | 6 | 6 |
| Bis (6-tert-butyl-3-methylphenol) sulfoxide |  | 1.5 |  |
| Bis (4,6-di-tert-butyl-3-methylphenol) sulfoxide |  |  | 1.5 |
| Thickness | .020 | .005 | .006 |
| Body | P-L | P-F | G |
| Tack | 1— | 3— | 5— |
| Sheeting | SSF | SFF | FFF |

[1] Solvenol, supplied by Hercules Powder Company.
[2] A light colored, flaky, medium hard solid which had a melting point of 115° to 125° C. and was supplied by the Barrett Division, Allied Chemical and Dye Corporation, under the trade designation "Cumar 2½ M. H."

As shown by Table I, reclaims prepared by the use of sulfoxides of the present invention as reclaiming agents, possessed qualities substantially superior to the qualities of the control sample heated in the absence of a sulfoxide—they were softer, had better body and tack and showed better sheeting qualities.

The same quantities of the sulfoxides of this invention as those effectively used above with vulcanized GR-S scrap do not produce as substantial a degree of reclaiming on vulcanized neoprene and on vulcanized N-type rubbers. This no doubt results from the inherent chemical inertness of synthetic rubbers of these latter two types. Nevertheless, even with such small proportions, reclaiming activity is demonstrable. Slightly greater quantities of sulfoxide, therefore, are desirable for commercial reclaiming of neoprene and N-type rubbers.

The invention is not limited to the specific examples, processes, conditions or quantities set forth herein. The phenol sulfoxides of this invention may be prepared by other suitable methods as for example by reacting a phenol having the desired degree of alkylation with thionyl chloride. In addition to the specific compounds presented for illustrative purposes the other di-, tri-, and tetra-alkyl phenol sulfoxides are similarly effective in reclaiming vulcanized conjugated diene polymer compositions. Not only are the sulfoxides of this invention effective on scrap composed of one particular type of rubber or synthetic rubber but they are also effective on scrap containing a mixture of various different types, as for example, of natural rubber and GR-S. The amount of reclaiming agent required to achieve the desired results is not critical and may well be varied from 0.05 to 10 parts by weight for every 100 parts of vulcanized scrap. The temperatures and pressures set out above are also not critical and are limited only by equipment and economic considerations. Temperatures have been varied over a range of 150° to 550° F. and steam under a gage pressure as high as 900 p. s. i. has been utilized. Moreover, the invention may also be practiced by employing the chemical catalytic agents thereof in combination with other conventional reclaiming methods, as for example those ordinarily used with the digester and high pressure processes. Other variations appearing naturally to those skilled in the art are likewise within the contemplation of this invention.

What is claimed is:

1. A process of reclaiming a vulcanized conjugated diene polymer composition which comprises heating the composition in the presence of a bis phenol sulfoxide of the general formula

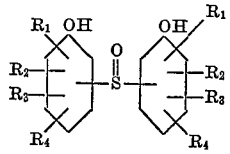

wherein $R_1$, $R_2$, $R_3$, and $R_4$ are selected from the group consisting of hydrogen and alkyl radicals, at least two of said $R_1$, $R_2$, $R_3$, and $R_4$ being alkyl radicals.

2. A process of reclaiming a vulcanized conjugated diene polymer composition which comprises heating the composition in the presence of bis (4, 6-di-tert-butyl-3-methylphenol) sulfoxide.

3. A process of reclaiming a vulcanized conjugated diene polymer composition which comprises heating the composition in the presence of bis (6-tert-butyl-3-methylphenol) sulfoxide.

4. A process of reclaiming a vulcanized copolymer of butadiene and styrene which comprises heating said vulcanized copolymer in the presence of a bis phenol sulfoxide of the general formula

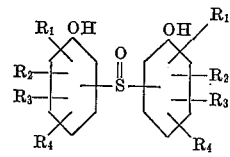

wherein $R_1$, $R_2$, $R_3$, and $R_4$ are selected from the group consisting of hydrogen and alkyl radicals, at least two of said $R_1$, $R_2$, $R_3$, and $R_4$ being alkyl radicals.

5. A process of reclaiming vulcanized natural rubber which comprises heating the rubber in the presence of a bis phenol sulfoxide having the general formula

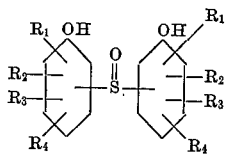

wherein $R_1$, $R_2$, $R_3$, and $R_4$ are selected from the group consisting of hydrogen and alkyl radicals, at least two of said $R_1$, $R_2$, $R_3$, and $R_4$ being alkyl radicals.

6. A process of reclaiming a vulcanized mixture of natural rubber and a butadiene-styrene copolymer which comprises heating the vulcanized mixture in the presence of a bis phenol sulfoxide having the general formula

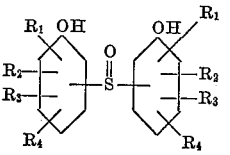

wherein $R_1$, $R_2$, $R_3$, and $R_4$ are selected from the group consisting of hydrogen and alkyl radicals, at least two of said $R_1$, $R_2$, $R_3$, and $R_4$ being alkyl radicals.

WENDELL S. COOK.

REFERENCES CITED

The following references are of record in the file of this patent:

UNITED STATES PATENTS

| Number | Name | Date |
| --- | --- | --- |
| 2,359,122 | Kirby et al. | Sept. 26, 1944 |

OTHER REFERENCES

Cook et al. Ind. & Eng. Chem. July 1948 pp. 1194–1202.

J. Gazdar et al., Chem. Soc. (London) 97, 2248 (1910).